United States Patent
Yonebayashi et al.

(10) Patent No.: US 6,933,233 B2
(45) Date of Patent: Aug. 23, 2005

(54) LIQUID MATERIAL SUPPLY SYSTEM AND METHOD FOR SEMICONDUCTOR MANUFACTURING

(75) Inventors: Makoto Yonebayashi, Kyoto (JP); Hideaki Miyamoto, Kyoto (JP); Tetsuo Shimizu, Kyoto (JP)

(73) Assignee: Stec, Inc., Kyoto (JP)

( * ) Notice: Subject to any disclaimer, the term of this patent is extended or adjusted under 35 U.S.C. 154(b) by 151 days.

(21) Appl. No.: 10/383,892

(22) Filed: Mar. 7, 2003

(65) Prior Publication Data

US 2003/0209143 A1 Nov. 13, 2003

(30) Foreign Application Priority Data

Mar. 13, 2002 (JP) .................................... 2002-069122

(51) Int. Cl.⁷ ........................................... H01L 21/302
(52) U.S. Cl. ........................ 438/689; 118/319; 118/52
(58) Field of Search ..................... 438/689; 118/319, 118/52, 696, 58

(56) References Cited

U.S. PATENT DOCUMENTS

| | | | | |
|---|---|---|---|---|
| 4,544,446 A | * | 10/1985 | Cady ........................... | 438/689 |
| 5,746,904 A | * | 5/1998 | Lee .............................. | 205/757 |
| 5,935,331 A | * | 8/1999 | Naka et al. ................... | 118/319 |
| 6,679,272 B2 | * | 1/2004 | Bran et al. .................... | 134/1.3 |
| 6,695,926 B1 | * | 2/2004 | Koyanagi et al. .............. | 134/2 |

\* cited by examiner

*Primary Examiner*—Michael Lebentritt
*Assistant Examiner*—Olivia T. Luk

(57) ABSTRACT

A liquid material supply system in which an inert gas is injected into a material tank accommodating a liquid material so as to discharge the liquid material into a liquid material discharge pipe connected to the material tank and that the inert gas dissolved or mixed in the discharged liquid material is trapped by a gas trap provided on the liquid material discharge pipe, is constructed in such a manner that when a dissolution temperature characteristic of the inert gas with respect to the liquid material is negative, an upstream side of the liquid material discharge pipe with respect to the gas trap is heated while the downstream side of the liquid material discharge pipe with respect to the gas trap is cooled.

19 Claims, 2 Drawing Sheets

LIQUID MATERIAL SUPPLY SYSTEM AND METHOD FOR SEMICONDUCTOR MANUFACTURING

This application is based on an application number 2002-069122 filed in Japan, the content of which is hereby incorporated by reference.

BACKGROUND OF THE INVENTION

1. Field of the Invention

The present invention relates to a liquid material supply system and method for supplying a liquid material employed in semiconductor manufacturing and, more particularly, to an apparatus that employs gas pressure to supply a liquid material. Corrosive and toxic liquids are often used in semiconductor manufacturing and can be advantageously propelled by a source of inert gas while avoiding contact with traditional pumping hardware.

2. Description of Related Art

In the case where a liquid material is supplied to a use point while its flow rate is controlled, a gas pressure driven system, where pressure surges or ripples are few and the gas can be easily pressurized, is often used as a propelling system for the liquid material. In this gas pressurization system, an inert gas such as helium is injected into a material tank containing the liquid material so that the liquid material is forced into a discharge pipe.

In the present case, when the inert gas is being injected into the material tank, the inert gas can become dissolved in the liquid material up to its saturation amount according to Henry's law. When a large difference of elevation or pressure loss exists in the liquid material discharge pipe connected to the material tank, the pressure of the liquid material discharged into the liquid material discharge pipe decreases and the gas dissolved in the liquid material can be released so that the flow control becomes unstable.

Thus, in a conventional liquid material supply apparatus of this type, a gas trap is provided for capturing and removing the dissolved gas as much as possible. However, even when such a gas trap is provided as described above, such dissolved gas still may persist in higher than acceptable amounts.

Meanwhile, the temperature characteristic of a dissolved gas volume with respect to a liquid indicates an eigenvalue in accordance with the types of the liquid and the gas. For example, in the case where the dissolution temperature characteristic of the volume of a dissolved gas with respect to a liquid is negative, that is, in the case where the dissolved gas volume decreases with increasing temperature, release of the dissolved gas (degassing) can be facilitated by heating the liquid material. Conversely, in the case where the dissolution temperature characteristic of a dissolved gas volume with respect to a liquid is positive, that is, in the case where a dissolved gas volume increases with increasing temperature, release of the dissolved gas can be facilitated by cooling the liquid material.

The present invention has been made while attention is directed to the above described matters, and it is an object of the present invention to provide a liquid material supply system and method in which the dissolved gas in the liquid material can be reliably removed.

SUMMARY OF THE INVENTION

As illustrated in FIG. 1, an inert gas is injected into a material tank accommodating a liquid material. The liquid material in the tank is forced out of the tank and into a discharge pipe connected to the material tank. In this process, some portion of the pressurized inert gas may become dissolved or mixed in the discharged liquid material. This liquid material and pressurized gas flows into a gas trap, where the dissolved gas is removed by the process of either heating or cooling the liquid material and pressurized gas immediately before entering the gas trap. When the dissolution temperature characteristic of the inert gas with respect to the liquid material is negative, the upstream side of the liquid material discharge pipe with respect to the gas trap is heated while the downstream side of the liquid material discharge pipe with respect to the gas trap is cooled. As illustrated in FIG. 2, when a dissolution temperature characteristic of the inert gas with respect to the liquid material is positive, the upstream side of the liquid material discharge pipe with respect to the gas trap is cooled while the downstream side of the liquid material discharge pipe with respect to the gas trap is heated. The liquid material flowing out of the gas trap is substantially free from the dissolved pressurized gas, and may be either heated or cooled depending on the intended use at the use point.

BRIEF DESCRIPTION OF THE DRAWINGS

The exact nature of this invention will be readily apparent from consideration of the following detailed description in conjunction with the accompanying drawings, wherein.

DETAILED DESCRIPTION OF THE PREFERRED EMBODIMENTS

Figure 1:
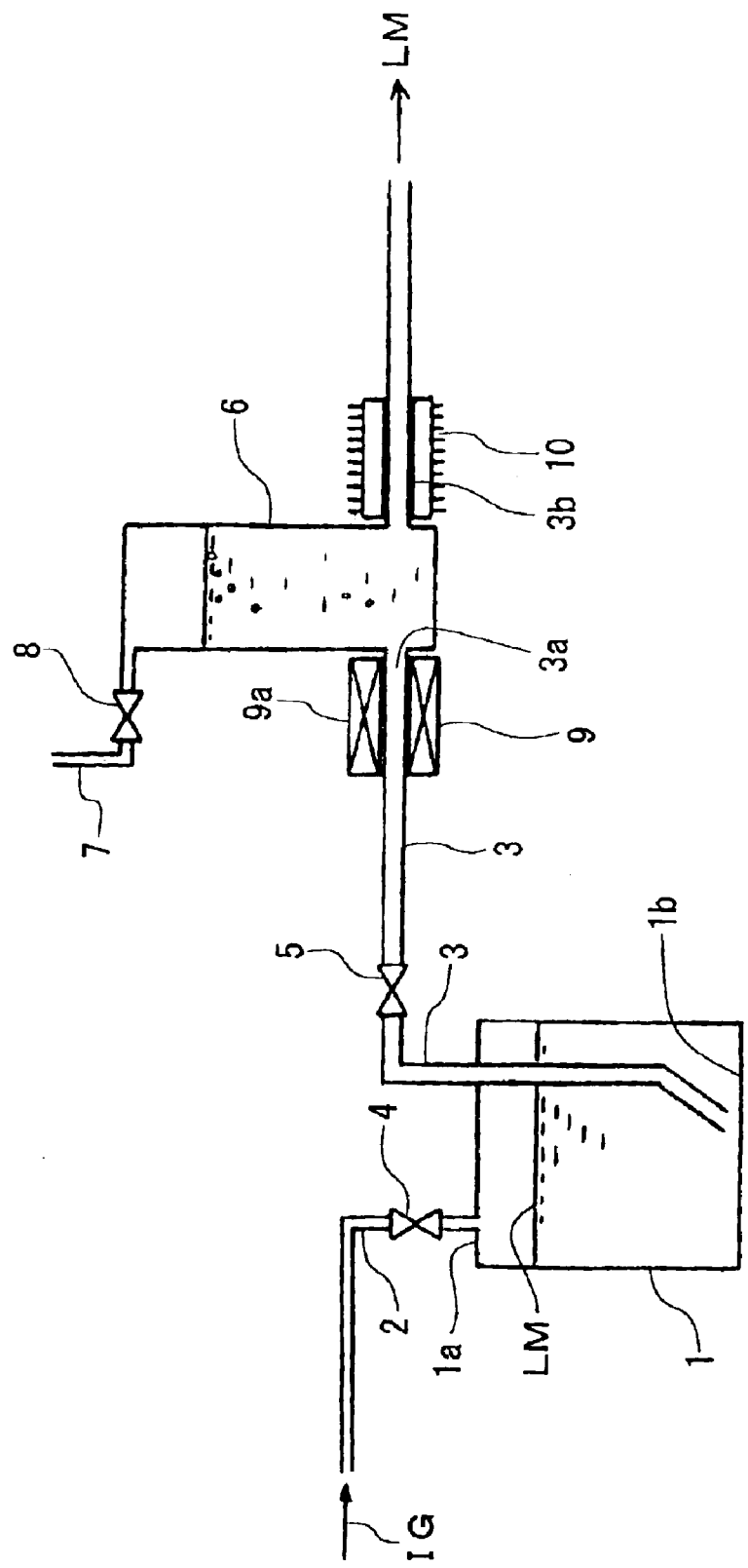
FIG. 1 is a view schematically illustrating one example of the structure of a liquid material supply system according to the present invention.

The detail of the present invention is explained below referring to the drawings which are not intended to limit the disclosure, but to illuminate pertinent parts. FIG. 1 schematically illustrates one example of a liquid material supply system according to the present invention. In this drawing, the reference numeral 1 indicates a material tank accommodating a liquid material LM. The reference numerals 2 and 3 designate an introduction pipe connected to the material tank 1 for an inert gas IG and a discharge pipe connected to the material tank 1 for a liquid material LM. In this embodiment, the dissolution temperature characteristic of the inert gas IG with respect to the liquid material LM is negative. In this specification, the term pressurized inert gas, pressurized gas, or gas, includes any gas which does not react chemically with the liquid material or the composition of the system as described.

Regarding the inert gas introduction pipe 2, the upstream side thereof is connected to an inert gas cylinder or other supply of pressurized gas (not shown), and the downstream end thereof is attached to an upper cover 1a so as to be communicated with the inside of the material tank 1. The inert gas introduction pipe 2 is provided with an on-off valve 4 and is constructed in such a way that the inert gas IG is supplied in the material tank 1 at a predetermined pressure. The liquid material discharge pipe 3 passes through the upper cover 1a, the upstream side end thereof is inserted close to the bottom plate 1b in the material tank 1, and a gas trap (described later) is provided in the downstream side thereof after an on-off valve 5.

The reference numeral 6 denotes the gas trap which is placed in a region that is downstream from the on-off valve 5 of the liquid material discharge pipe 3 and is in close proximity the material tank 1, and the gas trap retains the inert gas IG dissolved or mixed in the liquid material LM which is discharged from the material tank 1 into the liquid material discharge pipe 3. An introduction pipe part 3a for the liquid material LM is connected to one side of a lower part of the gas trap 6, and a discharge pipe part 3b for the liquid material LM is connected to another side thereof. The inside of the gas trap 6 is liquidly sealed by the liquid material LM, and a gas discharge pipe 7 is connected to an upper part of the gas trap 6. An on-off valve 8 is provided on the gas discharge pipe 7, and the downstream of the gas discharge pipe 7 is connected to a suitable gas collection mechanism (not shown). The discharge part 3b in the downstream side of the gas trap 6 is connected to a use point (e.g., a semiconductor manufacturing apparatus) via a suitable conduit (not shown). The term pipe herein includes a conduit, or other closed conduction path for the materials described.

A heating unit 9 in which a suitable heater 9a is contacted with the introduction pipe part 3a that is on the inlet side (upstream side) of the liquid material LM which flows through the liquid material discharge pipe 3 toward the gas trap 6, while provided with the discharge pipe part 3b on the outlet side (downstream side) of the liquid material LM in the gas trap 6 is a cooling device 10, for example, of a water cooling type. The heating unit 9 may be interposed as a separate unit between the liquid material discharge pipe 3 and the introduction part 3a of the gas trap. The heating unit represents a thermal transfer unit which may apply heat by using a hot water bath, electro-resistive elements, burning of a combustible material, or other method. Other forms of cooling are also possible, including natural cooling, so the invention of this embodiment may be practiced without the cooling device 10. The cooling unit 10 may be interposed as a separate unit between the discharge pipe part 3b of the gas trap and the conduit to the use point.

The thermal transfer units 9 and 10 may comprise a plurality of thermal transfer elements. Hence, thermal transfer units 9 and 9a may be considered operatively as a single thermal transfer unit. Similarly, thermal transfer units 10 and 10a may be considered operatively as a single thermal transfer unit.

In the liquid material supply apparatus of the above-described structure, by injecting the inert gas IG into the material tank 1, the liquid material LM in the material tank 1 is discharged to the outside of the material tank 1 through the liquid material discharge pipe 3. In this case, the inert gas IG may be dissolved in the liquid material LM up to its saturation amount according to Henry's law. Therefore, the inert gas IG may exist as a dissolved gas in the liquid material LM which is discharged to the outside of the material tank 1 through the liquid material discharge pipe 3.

The liquid material LM containing a predetermined amount of dissolved gas flows in the liquid material discharge pipe 3 downstream and enters the the gas trap 6 via the inlet pipe part 3a on the side of the gas trap 6. At this time, since the inlet pipe 3a is heated up to a temperature necessary for releasing the dissolved gas, the dissolved gas (inert gas IG) in the liquid material LM begins to bubble and in such a state the gas and the liquid material LM enter the inside of the gas trap 6. In the gas trap 6, the dissolved gas separates from the liquid material LM, and the dissolved gas is discharged to the outside of the gas trap 6 via the gas discharge pipe 7. The liquid material LM that is discharged from the gas trap 6 via the discharge pipe part 3b is substantially free from the dissolved inert gas IG, and this discharged liquid material LM flows from the gas trap outlet to a use point. In this embodiment, the liquid material LM may be cooled by the cooling device 10 provided on the discharge pipe part 3b to be a predetermined temperature. The cooling device represents a thermal transfer unit which may remove heat by using a cold water bath, contact with a refrigeration unit, natural cooling, or other method.

In the liquid material supply apparatus in the above-described embodiment, the liquid material LM is discharged from the material tank 1 to the liquid material discharge pipe 3 when the inert gas IG is injected into the inside of the material tank 1 which accommodates the liquid material LM which is in a relationship that the dissolution temperature characteristic of the inert gas IG with respect to the liquid material LM is negative, and in the case where the gas dissolved in the discharged liquid material LM is trapped by the gas trap 6 provided on the liquid material discharge pipe 3, the liquid material LM immediately before introduction into the gas trap 6 is heated to a predetermined temperature so that the gas dissolved in the liquid material LM is released. Thus, the vapor-liquid separation in the gas trap 6 is smoothly performed, and the dissolved gas in the liquid material LM can be reliably removed. Accordingly, since generation of bubbles in a flow rate measurement section and a flow rate control section for the liquid material LM is reliably prevented, the flow rate of the liquid material LM can be controlled with greater stability.

In the liquid material supply apparatus, it is preferred that the heating device 9 is provided so as to heat a portion which is as close as possible to the gas trap 6 for the liquid material discharge pipe 3.

In the case where the dissolution temperature characteristic of the inert gas IG with respect to the liquid material LM is positive, that is, in the case where the dissolved gas volume increases with increasing temperature, by cooling the liquid material LM, release of the dissolved gas can be facilitated. Thus, in such a case, as shown in FIG. 2, the cooling device 10 is provided on the introduction pipe part 3a of the gas trap 6 so that the liquid material LM immediately before introduction into the gas trap 6 is cooled, while the heating device 9 is provided on the discharge pipe part 3b of the gas trap 6 so that the liquid material LM for which vapor-liquid separation is performed is heated to a predetermined temperature.

Even in the liquid material supply apparatus of such a structure, vapor-liquid separation in the gas trap 6 is smoothly performed similarly to that of the liquid material supply apparatus shown in FIG. 1, so that the dissolved gas in the liquid material LM can be reliably removed. Therefore, since generation of bubbles in a flow rate measurement section and a flow rate control section for the liquid material LM is prevented reliably, the flow rate of the liquid material LM can be controlled stably.

Figure 2:
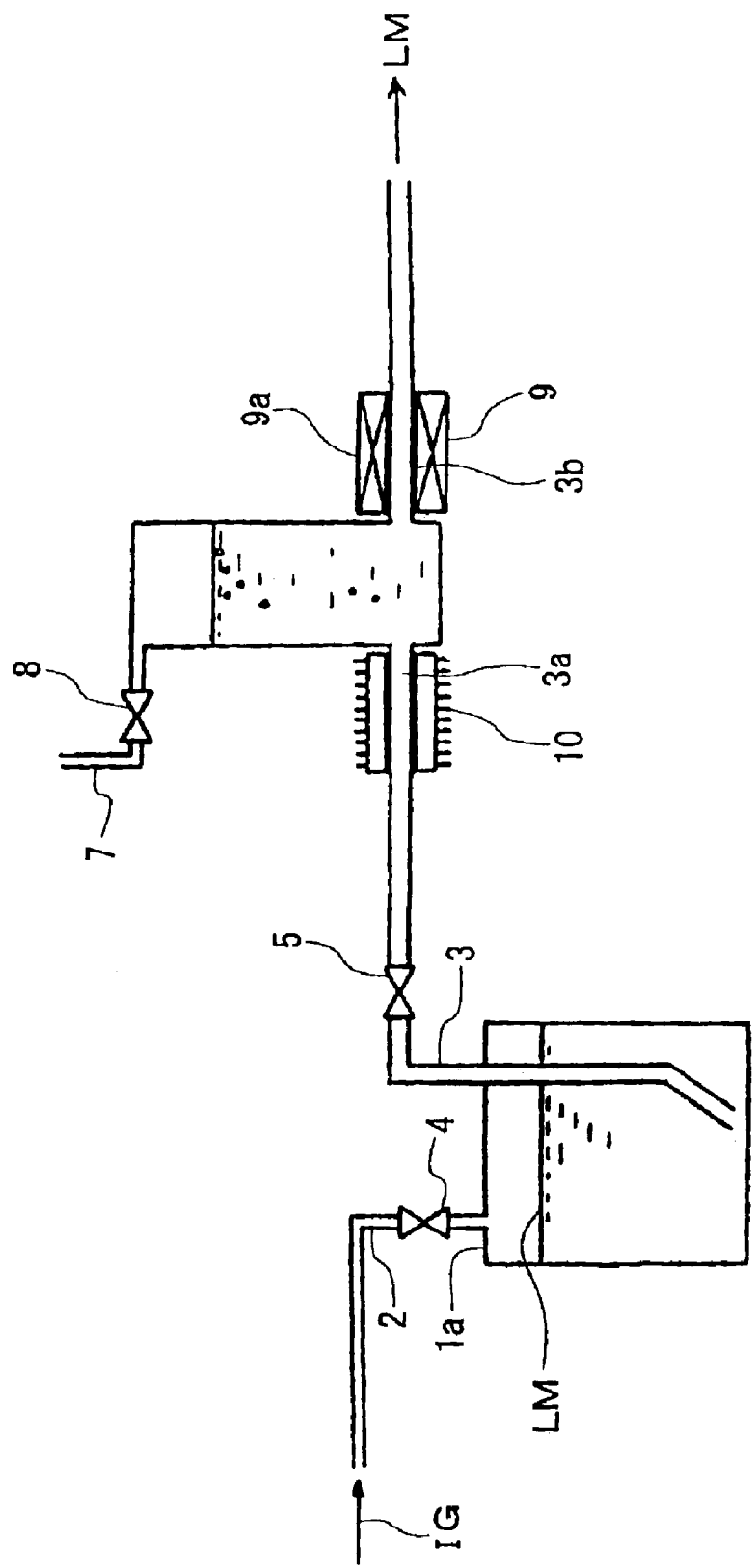
FIG. 2 is a view schematically illustrating another example of the structure of a liquid material supply system according to the present invention.

In the liquid material supply apparatus shown in FIG. 2, it is preferred that the cooling device 10 is provided so as to cool a portion which is as close as possible to the gas trap 6 of the liquid material discharge pipe 3.

As explained above, in the present invention, in a liquid material supply apparatus constructed in such a manner that an inert gas is injected into a material tank accommodating a liquid material so as to discharge the liquid material into a liquid material discharge pipe connected to the material tank and to trap the inert gas dissolved or mixed in the discharged liquid material by a gas trap provided on the liquid material discharge pipe, due to a very simple construction in which an inlet side with respect to the gas trap is heated (or cooled) while an outlet side of the gas trap is cooled (heated), the dissolved gas or mixed gas contained in the liquid material which is discharged into the liquid material discharge pipe can be reliably removed.

What is claimed is:

1. A system for supplying a liquid material for use in semiconductor manufacturing, comprising:
    a source of pressurized gas;
    a sealed tank for holding a liquid material, the sealed tank including an introduction conduit and a discharge conduit, the introduction conduit connected to the source of pressurized gas, the pressurized gas forcing a predetermined quantity of the liquid material out of the sealed tank through the sealed tank discharge conduit;
    a first thermal transfer unit for removing heat, having a first end and a second end, attached at the first end to the sealed tank discharge conduit; and
    a gas trap assembly wherein dissolved pressurized gas in the liquid material separates from the liquid material, the gas trap assembly including an inlet conduit and an outlet conduit, the gas trap inlet conduit connected to the second end of the first thermal transfer unit and in close proximity to the gas trap, the gas trap outlet conduit discharging the degassed liquid material to a use point.

2. The system of claim 1,
    wherein the sealed tank discharge conduit is connected directly to the gas trap inlet conduit and the first thermal transfer unit operatively contacts the inlet conduit in close proximity to the gas trap assembly.

3. The apparatus of claim 1,
    wherein the gas trap assembly further comprises a discharge conduit to allow separated gas to escape from the gas trap assembly.

4. The system of claim 1, further comprising:
    a second thermal transfer unit, including a first end and a second end, the first end connected to the gas trap outlet conduit, in close proximity to the gas trap assembly, the second end discharging the degassed liquid material to a use point.

5. The system of claim 4,
    wherein the gas trap outlet discharges the degassed liquid material to a use point and the second thermal transfer unit operatively contacts the gas trap outlet conduit in close proximity to the gas trap assembly.

6. The system of claim 5, wherein the first thermal transfer unit applies heat and the second thermal transfer unit removes heat.

7. The system of claim 5, wherein the first thermal transfer unit removes heat and the second thermal transfer unit applies heat.

8. A system for separating a dissolved gas from a liquid material, comprising:
    a source of a liquid material with a dissolved gas;
    a first thermal transfer unit, including a first end and a second end, the first end connected to the source of a liquid material with a dissolved gas;
    a gas trap assembly wherein dissolved pressurized gas in the liquid material separates from the liquid material, the gas trap assembly including an inlet conduit and an outlet conduit, the gas trap inlet conduit connected to the second end of the first thermal transfer unit, and in close proximity to the gas trap; and
    a second thermal transfer unit, including a first end and a second end, the first end connected to the outlet conduit of the gas trap, and in close proximity to the gas trap, the second end discharging the degassed liquid material to a use point.

9. The system of claim 8,
    wherein the first thermal transfer unit applies heat and the second thermal transfer unit removes heat.

10. The system of claim 8,
    wherein the first thermal transfer unit removes heat and the second thermal transfer unit applies heat.

11. The system of claim 8,
    wherein the source of a liquid material with a dissolved gas connects directly with the gas trap inlet conduit, and the first thermal transfer unit contacts the outside of the gas trap inlet conduit in close proximity to the gas trap assembly, and
    wherein the gas trap outlet conduit discharges the degassed liquid material to a use point, and the second thermal transfer unit contacts the outside of the gas trap outlet conduit in close proximity to the gas trap assembly.

12. A system for supplying a liquid material for use in semiconductor manufacturing, comprising:
    a source of pressurized gas;
    a sealed tank for holding a liquid material, the sealed tank including an introduction conduit and a discharge conduit, the introduction conduit connected to the source of pressurized gas, the pressurized gas forcing a predetermined quantity of the liquid material out of the sealed tank through the sealed tank discharge conduit;
    a first thermal transfer unit, having a first end and a second end, attached at the first end to the sealed tank discharge conduit;
    a second thermal transfer unit, including a first end and a second end, the first end connected to the gas trap outlet conduit, in close proximity to the gas trap assembly, the second end discharging the degassed liquid material to a use point; and
    a gas trap assembly wherein dissolved pressurized gas in the liquid material separates from the liquid material, the gas trap assembly including an inlet conduit and an outlet conduit, the gas trap inlet conduit connected to the second end of the first thermal transfer unit and in close proximity to the gas trap, the gas trap outlet conduit discharging the degassed liquid material to a use point.

13. The system of claim 3,
    wherein the sealed tank discharge conduit is connected directly to the gas trap inlet conduit and the first thermal transfer unit operatively contacts the inlet conduit in close proximity to the gas trap assembly.

14. The system of claim 12, wherein the first thermal transfer unit applies heat.

15. The system of claim 12, wherein the first thermal transfer unit removes heat.

16. The apparatus of claim 12,
    wherein the gas trap assembly further comprises a discharge conduit to allow separated gas to escape from the gas trap assembly.

17. The system of claim 12,
    wherein the gas trap outlet discharges the degassed liquid material to a use point and the second thermal transfer unit operatively contacts the gas trap outlet conduit in close proximity to the gas trap assembly.

18. The system of claim 17, wherein the first thermal transfer unit applies heat and the second thermal transfer unit removes heat.

19. The system of claim 17, wherein the first thermal transfer unit removes heat and the second thermal transfer unit applies heat.

* * * * *